United States Patent [19]

Brown et al.

[11] Patent Number: 5,409,062
[45] Date of Patent: Apr. 25, 1995

[54] METHOD OF INHIBITING RESERVOIR SCALE

[75] Inventors: J. Michael Brown, The Woodlands, Tex.; Gene F. Brock, Oxnard, Calif.

[73] Assignee: Betz Laboratories, Inc., Trevose, Pa.

[21] Appl. No.: 169,781

[22] Filed: Dec. 17, 1993

[51] Int. Cl.⁶ .................. E21B 43/12; E21B 43/22
[52] U.S. Cl. ................................ 166/279; 166/371
[58] Field of Search .............. 166/279, 310, 371; 252/8.552; 210/698

[56] References Cited

U.S. PATENT DOCUMENTS

| | | | |
|---|---|---|---|
| 3,703,928 | 11/1972 | Fulford | 166/275 |
| 4,032,460 | 6/1977 | Zilch et al. | 166/279 X |
| 4,860,829 | 8/1989 | Carlberg et al. | 166/279 |
| 5,018,577 | 5/1991 | Pardue et al. | 166/279 |
| 5,060,728 | 10/1991 | Yan | 166/279 |
| 5,062,962 | 11/1991 | Brown et al. | 210/698 |
| 5,147,555 | 9/1992 | Brown et al. | 210/698 |
| 5,181,567 | 11/1993 | Shuler | 166/279 |
| 5,263,541 | 11/1993 | Barthorpe et al. | 166/279 |

OTHER PUBLICATIONS

"Results of Field Tests With A New Extended Squeeze Life Scale Inhibitor", Pardue, '92 NACE Annual Conference & Corrosion Show.

*Primary Examiner*—George A. Suchfield
*Attorney, Agent, or Firm*—Alexander D. Ricci; Steven D. Boyd

[57] ABSTRACT

A method of inhibiting the formation and deposition of scale in the production of hydrocarbons from subterranean reservoirs. The method is particularly effective at inhibiting the formation and deposition of calcium and barium scales in the produced waters of hydrocarbon recovery operations. The method comprises introducing into the produced water a polyepoxysuccinic acid of the general formula:

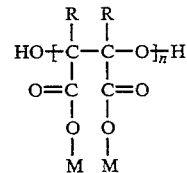

where n ranges from about 2 to about 11, M is hydrogen or a water soluble cation such as $Na^+$, $NH_4^+$, $K^+$ and R is hydrogen, $C_{1-4}$ alkyl or $C_{1-4}$ substituted alkyl.

7 Claims, No Drawings

METHOD OF INHIBITING RESERVOIR SCALE

FIELD OF THE INVENTION

The present invention relates to the inhibition of scale formation. More particularly, the present invention relates to the use of polyepoxysuccinic acid in a squeeze treatment of a subterranean reservoir to inhibit scale formation.

BACKGROUND OF THE INVENTION

In the production of hydrocarbons from subterranean reservoirs, the deposition of solid salts, or scale on surfaces, down hole tubing and equipment is a major production problem. The problem increases as the water-cut in the produced fluid increases. Scales are slightly soluble inorganic salts, such as calcium or barium sulfates or calcium carbonate, etc. These minerals are often found in the produced water of hydrocarbon recovery operations. Inhibition of scale formation is significantly more cost effective than a well cleanout and especially so when a threshold chemical treatment is used. Wells can be treated with scale inhibiting chemicals either as a batch job, with continuous treatment down the annulus or through a feed string, or by a squeeze treatment. A squeeze treatment is a common oil field practice for treating subterranean formations to inhibit scale formation. In a squeeze treatment, a scale inhibitor treatment is injected or squeezed into the reservoir formation. The scale inhibitor forced into the formation is either absorbed by the reservoir mineral, becomes phase trapped or precipitates in the formation. When the well is placed back into production, the inhibitor is slowly produced back into the well bore with the produced water to inhibit scale formation.

The most commonly used classes of inhibitor compounds are phosphonic acid salts, phosphate ester salts and polymeric (generally low molecular weight acrylic acid salts or modified polyacrylamide and copolymers thereof). Inorganic phosphates are also used but to a lesser extent. In squeeze treatments, the selection of the inhibitor used should be based upon which product gives the longest squeeze life, assuming inhibition and temperature stability requirements are satisfied.

A procedure called "precipitation squeeze" has been developed. In this process, the scale inhibitor reacts or is reacted to form an insoluble salt which precipitates in the pores of the formation rock. For example, see the process described in U.S. Pat. No. 4,860,829 in which a phosphonate scale inhibitor and a calcium chelate are employed as a "precipitation squeeze" treatment. The use of a phosphinico polycarboxylate in a precipitation squeeze treatment was disclosed in *Results of Field Tests With a New Extended Squeeze Life Scale Inhibitor*, a paper presented by J. E. Pardue at the 1992 NACE annual conference and corrosion show.

SUMMARY OF THE INVENTION

The present inventors have discovered that polyepoxysuccinic acid (hereinafter PESA) is an effective "squeeze treatment" for inhibiting scale formation in fluids produced from subterranean reservoirs. PESA is an effective scale control agent at substoichiometric or threshold levels. PESA controls scale formation without forming inhibitor-calcium complexes such as precipitates. PESA is effective at inhibiting the deposition of calcium scales such as calcium oxylate, calcium sulfate, as well as the more common calcium carbonate. PESA is also effective at inhibiting the deposition of barium and strontium sulfate scales. In addition to resisting the formation of inhibitor-calcium complexes, PESA is also tolerant to the presence of iron, in comparison to prior art scale control treatments such as polyacrylic acid.

The process of the present invention comprises pumping PESA either alone or with other scale control agents into a subterranean formation in a "squeeze treatment". The PESA has the general formula

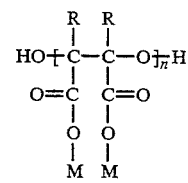

where n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl. Preferably, R is hydrogen. The use of PESA as a scale control agent in aqueous systems as well as a method of preparing PESA is described in U.S. Pat. Nos. 5,062,962 and 5,147,555 incorporated herein by reference.

In the present invention, the PESA is injected into a subterranean formation in an aqueous solution as part of a squeeze treatment. The aqueous solution may be a side stream of produced fluids from the subterranean formation such as produced water, hydrocarbon fluids, a mixture of hydrocarbon fluids and water and a mixture of water and hydrocarbon gases. The PESA is injected in such a concentration so as to provide a residual return of PESA at substoichiometric levels in the produced fluids. The substoichiometric levels of PESA will vary over time. Generally, an initial spike of PESA will occur when the formation is put back into production. Thereafter, the return of PESA in the production fluid will remain fairly constant throughout the life of the squeeze. The preferred concentration of PESA will depend in part upon the concentration of scale forming materials in the produced fluid, the water cut or ratio of water to oil in the produced fluid, the production rate, and the type of formation (i.e., carbonaceous or siliceous). A range of average PESA concentrations in the produced fluid during the life of the squeeze can vary from a trace up to about 100 ppm and preferably from about 0.1 to 100 ppm and more preferably from about 1 to about 10 ppm.

The PESA scale control agent of the present invention may be employed as the sole scale control agent or in combination with other conventional treatments such as polyacrylic acid, hydroxyethylenediphosphonic acid and/or phosphonates. The use of PESA as a scale control agent in a squeeze treatment can be preceded by, or combined with, an acid treatment. Acid treatment is employed to improve productivity, clean up well bore damage and/or remove scale.

In addition to use in a squeeze treatment, the PESA scale control treatment of the present invention could also be injected, either batch or continuously, into an injection well. Injection wells are used in secondary recovery operations to "push" oil toward a producing well. Treatment of a formation through an injection well could provide scale inhibitor to a number of producing wells simultaneously.

The present invention will now be further described with reference to a number of specific examples which are to be regarded solely as illustrative and not as restricting the scope of the present invention.

EXAMPLES

In the examples and tables which follow, abbreviations and trade names have been used to identify the samples tested. The following legend identifies the tradenames and gives the chemical name and commercial source for the samples.

PESA: polyepoxysuccinic acid;
"BAYHIBIT AM": 2-phosphobutane 1,2,4-tricarboxylic acid; Mobay Chemical Co.
"BELCLENE 500": copolymer of hypophosphite and acrylic acid; Ciba-Geigy Corp.
"DEQUEST 2054": hexamethylenediamine tetra(methylphosphonic acid); Monsanto Co.
"BELCLENE 200": Polymaleic acid; Ciba-Geigy Corp.
"GOODRITE K-732": polyacrylic acid; B. F. Goodrich Chemical Co.
"GOODRITE K-752": polyacrylic acid; B. F. Goodrich Chemical Co.
HEDP: 1-hydroxyethylidene 1,1-diphosphonic acid; Monsanto Co.
"CYANAMER P-80": polyacrylamide; American Cyanamid Co.
"BETZ HPS I": 6:1 acrylic acid/allyl hydroxypropylsulfonate ether sodium salt copolymer; Betz Laboratories, Inc.
"BETZ MHC": 6:1 acrylic acid/allyl hydroxypropylsulfonate ether sodium salt copolymer; Betz Laboratories, Inc.
"BELCOR 575": hydroxyphosphonocarboxylic acid; Ciba-Geigy Corp.
CMOS: carboxymethoxysuccinate
ODS: 2,2'-oxodissuccinate
"TRITON CF10": octylphenoxy-poly(ethoxy)ethanol; Rohm and Haas Co.
"COAG 88D": polyacrylic acid; Betz Laboratories, Inc.

Example 1

Table 1 summarizes static calcium carbonate inhibition testing for polyepoxysuccinic acid as well as several prior art calcium carbonate control agents at varying treatment levels and at varying LSI levels. The tests were performed by adding the treatment (sample) to a calcium solution of the described conditions. Sodium carbonate, adjusted to pH 9.0, was added and the mixture incubated at 70° C. After cooling, a measured portion was filtered and the pH adjusted to less than 2.0 with hydrochloric acid. The mixture was diluted and the pH adjusted to 12 with sodium hydroxide. A calcium indicator, murexide, was added and the solution titrated to a purple-violet endpoint with ethylene diaminetetraacetic acid. From titrations for the treated, stock and control solution the % inhibition was calculated. The conditions of the test were: 220 ppm Ca as $CaCO_3$, 234 ppm $CO_3$ as $CaCO_3$, pH 8.5, Temp. 70° C. at LSI 1.8; 551 ppm Ca as $CaCO_3$, 585 ppm $CO_3$ as $CaCO_3$, pH 8.5, Temp. 70° C. at LSI 2.5; 1102 ppm Ca as $CaCO_3$, 1170 ppm $CO_3$ as $CaCO_3$, pH 9.0, Temp. 70° C. at LSI 3.2. Table 1 shows that at higher LSI values, polyepoxysuccinic acid out performs the prior art calcium control agents when treatment levels exceed about 2 parts per million. At lower LSI values, polyepoxysuccinic acid is at least as effective as the prior art control agents at treatment levels greater than about 1 part per million.

TABLE 1

Static Calcium Carbonate Inhibition

| Sample | ppm Active | LSI 1.8 | LSI 2.5 | LSI 3.2 |
|---|---|---|---|---|
| PESA | 0.05 | 39.9 | 0.0 | 3.8 |
|  | 0.1 | 50.9 | 25.2 | 3.5 |
|  | 0.5 | 86.5 | 63.3 | 2.6 |
|  | 1.0 | 89.4 | 95.0 | 27.7 |
|  | 2.0 | 89.4 | 97.1 | 42.6 |
|  | 5.0 | 92.2 | 96.6 | 92.4 |
|  | 10.0 | 90.5 | 96.4 | 97.7 |
| HEDP | 0.05 | 44.9 | 42.0 | 5.5 |
|  | 0.1 | 57.3 | 68.2 | 6.4 |
|  | 0.5 | 89.3 | 97.1 | 54.0 |
|  | 1.0 | 95.1 | 99.3 | 73.4 |
|  | 2.0 | 94.1 | 97.7 | 74.8 |
|  | 5.0 | 89.6 | 96.4 | 75.4 |
|  | 10.0 | 81.2 | 92.5 | 76.1 |
| "GOODRITE K-732" | 0.05 | 25.9 | 8.3 | — |
|  | 0.1 | 37.1 | 13.6 | — |
|  | 0.5 | 61.5 | 63.5 | 8.0 |
|  | 1.0 | 75.1 | 78.5 | 28.2 |
|  | 2.0 | — | — | 59.3 |
|  | 5.0 | 98.6 | — | 71.4 |
|  | 10.0 | — | — | 74.4 |

Example 2

Table 2 summarizes the result of static calcium carbonate inhibition testing which compares polyepoxysuccinic acid to a number of prior art calcium carbonate inhibitors at varying treatment levels at a relatively high LSI number. Test procedures were the same as in Example 1 described above. The conditions of the test were: 1102 ppm Ca as $CaCO_3$; 1170 ppm $CO_3$ as $CaCO_3$, pH 9.0 Temp. 70° C. at LSI 3.2. As shown in Table 2, at treatment levels of 10 parts per million polyepoxysuccinic acid was at least as effective as all of the prior art calcium carbonate control agents at the high LSI level of this test.

TABLE 2

Static Calcium Carbonate Inhibition

| | % Inhibition | | |
|---|---|---|---|
| Sample | 2 ppm | 5 ppm | 10 ppm |
| PESA | 43.3 | 86.1 | 96.5 +/− 2.8% |
| "BAYHIBIT AM" | 85.1 | 86.5 | 93.6 |
| "BELCLENE 500" | 59.4 | — | 93.3 |
| "DEQUEST 2054" | 77.3 | — | 91.2 |
| "BELCLENE 200" | 66.0 | — | 83.2 |
| "GOODRITE K-752" | 62.9 | 71.4 | 80.6 |
| HEDP | 75.1 | 75.2 | 78.3 |
| "CYANAMER P-80" | 54.1 | — | 73.2 |
| "BETZ MHC" | 53.0 | 60.6 | 66.8 |
| "BELCOR 575" | 22.9 | — | 66.5 |

Example 3

Table 3 summarizes data with respect to the calcium tolerance of polyepoxysuccinic acid and several prior art calcium carbonate control agents. In this test, 100 parts per million of each treatment was added to a 1.0 molar calcium chloride solution and the turbidity (as percent light transmittance at 415 nm) was measured. Turbidity would be a result of the formation of an insoluble complex of the treatment with calcium ions. One of the most calcium tolerant commercial phosphonate products for calcium carbonate inhibition is "BAY- HIBIT AM." As shown in Table 3, polyepoxysuccinic acid as well as "BETZ MHC" exhibited a significantly lower turbidity which indicates high calcium tolerance.

TABLE 3

Calcium Tolerance
Conditions: 0.1M CaCl   pH 9.0   Temp. 70° C.
100 ppm Treatment   Indv. pH Adjusted

| Sample | Appearance | % Transmittance (415 nm) |
| --- | --- | --- |
| PESA | Clear | 99.0 |
| "BAYHIBIT AM" | Turbid (Floc) | 75.5 |
| "GOODRITE K-752" | Mod. Turbid | 84.5 |
| "BETZ MHC" | Clear | 98.0 |

Example 4

Table 4 summarizes data with respect to the iron tolerance of polyepoxysuccinic acid and several prior art calcium carbonate control agents. The percent inhibition values for 5 ppm inhibitor are reported for 0,1,5 and 10 ppm iron III. The test conditions were: 1102 ppm Ca as $CaCO_3$, 1170 ppm $CO_3$ as $CaCO_3$, pH 9.0, Temp. 70° C. LSI 3.2.

As shown in Table 4, at 5 ppm active inhibitor and 10 ppm iron III, PESA maintained 55% efficacy, "BAYHIBIT AM" maintained 53% efficacy and HEDP and polyacrylic acid much less.

TABLE 4

Iron Tolerance
Percent Inhibition

| ppm $Fe^{+3}$ | PESA | "BAYHIBIT AM" | HEDP | "GRK-752" |
| --- | --- | --- | --- | --- |
| 0 | 69.2 | 90.9 | 70.4 | 60.7 |
| 1 | 55.3 | 78.0 | 72.6 | 62.1 |
| 5 | 46.1 | 65.3 | 52.9 | 16.6 |
| 10 | 37.9 | 48.1 | 9.8 | 9.1 |

Example 5

Table 5 summarizes data with respect to barium sulfate inhibition testing for PESA and hexametaphosphate (which is a known barium sulfate inhibitor) at varying treatment levels. The test conditions were: 2 ppm Ba, 1000 ppm $SO_4$, pH 5.5 and Temp. 60°. As shown in Table 5 PESA is superior to hexametaphosphate at low treatment levels.

TABLE 5

| Treatment | Barium Sulfate Inhibition | |
| --- | --- | --- |
| | ppm Active | % Inhibition |
| hexametaphosphate | 1.0 | 63.6 |
| | 2.5 | 83.2 |
| | 5.0 | 100.0 |

TABLE 5-continued

| Treatment | Barium Sulfate Inhibition | |
| --- | --- | --- |
| | ppm Active | % Inhibition |
| PESA | 1.0 | 94.4 |
| | 1.0 | 91.6 |
| | 2.5 | 100.0 |
| | 2.5 | 100.0 |
| | 5.0 | 100.0 |
| | 5.0 | 100.0 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A process of inhibiting scale formation produced in fluids containing water and hydrocarbons produced from a subterranean reservoir via a well bore which comprises injecting down the well bore and into the reservoir, a substoichiometric amount of a scale inhibitor comprising a poly epoxysuccinic acid of the general formula

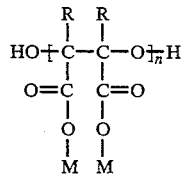

wherein n ranges from about 2 to about 50, M is hydrogen or a water soluble cation and R is hydrogen, $C_{1-4}$ alkyl or $C_{1-4}$ substituted alkyl.

2. The process of claim 1 wherein M is selected from the group consisting of $Na^+$, $NH_4^+$, $K^+$.

3. The process of claim I further including injection of phosphonates and/or polyacrylic acid down said well bore into said reservoir with said polyepoxysuccinic acid.

4. The process of claim 1 wherein the scale inhibited includes scales of calcium, barium and strontium.

5. The process of claim 1 wherein the scale inhibited includes scales of carbonate, sulfates and silicates.

6. The process of claim 1 wherein the fluids produced from said subterranean reservoir and selected from the group consisting of mixtures of water and hydrocarbon fluids, and mixtures of water and hydrocarbon gases.

7. The process of claim 6 wherein said scale inhibitor is injected into the well bore in combination with a side stream of said fluids produced from said subterranean reservoir.

* * * * *